US009469253B2

(12) United States Patent
Brunard et al.

(10) Patent No.: US 9,469,253 B2
(45) Date of Patent: Oct. 18, 2016

(54) HOLDER DEVICE FOR A PORTABLE ELECTRONIC APPARATUS, DASHBOARD EQUIPPED WITH SUCH A DEVICE

(71) Applicant: Faurecia Interieur Industrie, Nanterre (FR)

(72) Inventors: Christophe Brunard, Bois Colombes (FR); Bruno Dinant, Saing-Brice-Sous-Foret (FR); Daniel Rodriques, Le Blanc Mesnil (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/270,740

(22) Filed: May 6, 2014

(65) Prior Publication Data
US 2014/0339847 A1 Nov. 20, 2014

(30) Foreign Application Priority Data
May 17, 2013 (FR) ...................................... 13 54458

(51) Int. Cl.
*B60R 11/02* (2006.01)
*B60R 11/00* (2006.01)

(52) U.S. Cl.
CPC ........ *B60R 11/02* (2013.01); *B60R 2011/0005* (2013.01); *B60R 2011/0094* (2013.01)

(58) Field of Classification Search
CPC ..... B60R 7/06; B60R 11/02; B60R 11/0241; B60R 11/0258; B60R 2011/0005
USPC ...................... 296/37.12, 37.8, 70
See application file for complete search history.

(56) References Cited

U.S. PATENT DOCUMENTS

| 5,694,468 | A | * | 12/1997 | Hsu ............................... 379/446 |
| 5,974,333 | A | * | 10/1999 | Chen ................... B60R 11/0241 455/346 |
| 7,004,517 | B2 | * | 2/2006 | Vitry et al. ................... 292/213 |

(Continued)

FOREIGN PATENT DOCUMENTS

| DE | 10 2012 008381 A1 | 3/2013 |
| FR | 2 768 975 A1 | 4/1999 |

(Continued)

OTHER PUBLICATIONS

French Search Report for Application FR 13 54458, dated Dec. 2, 2013, 3 pages—In French.

(Continued)

*Primary Examiner* — Jason S Morrow
*Assistant Examiner* — E Turner Hicks
(74) *Attorney, Agent, or Firm* — Reising Ethington P.C.

(57) ABSTRACT

A holder device for a portable electronic apparatus for a motor vehicle. The device includes a stationary frame, secured to a structural element of the vehicle, and a drawer connected to the frame. The connection of the drawer to the frame is arranged such that the drawer is movable relative to the frame between a storage position and a usage position of the electronic apparatus. The connection provides a sliding movement between the storage and usage positions. In the usage position, a usage volume is at least partially delimited by the frame and the drawer. The portable electronic apparatus cam be maintained in the usage volume by a first and a second stop member coming into contact with the apparatus in at least two opposite points thereof and biased toward one another by at least one elastic member.

17 Claims, 3 Drawing Sheets

(56) References Cited

U.S. PATENT DOCUMENTS

| | | | |
|---|---|---|---|
| 7,201,420 B2* | 4/2007 | Vican | 296/37.12 |
| 7,708,328 B2* | 5/2010 | Doom et al. | 296/37.12 |
| 7,900,988 B2* | 3/2011 | Ryu | 296/37.12 |
| 8,002,179 B2* | 8/2011 | Feit et al. | 235/382 |
| 2006/0278788 A1* | 12/2006 | Fan | 248/309.1 |
| 2008/0174136 A1* | 7/2008 | Welschholz et al. | 296/37.12 |
| 2011/0156637 A1 | 6/2011 | Thorsell et al. | |
| 2013/0093205 A1* | 4/2013 | Stephan | 296/37.12 |

FOREIGN PATENT DOCUMENTS

| | | |
|---|---|---|
| FR | 2 932 442 A1 | 12/2009 |
| FR | 2 987 007 A1 | 8/2013 |

OTHER PUBLICATIONS

Written Opinion for Application FR 13 54458, dated May 17, 2013, 4 pages—In French.

* cited by examiner

HOLDER DEVICE FOR A PORTABLE ELECTRONIC APPARATUS, DASHBOARD EQUIPPED WITH SUCH A DEVICE

TECHNICAL FIELD

The present invention generally relates to holder devices for a portable electronic apparatus for motor vehicles. More specifically, the invention relates, according to a first aspect, to a holder device for a portable electronic apparatus for a motor vehicle, of the type comprising a stationary frame, secured to a structural element of the vehicle, and a drawer in which a connection of the drawer to the frame is arranged such that the drawer is movable relative to the frame between a storage position and a usage position of the electronic apparatus.

BACKGROUND

FR 2,932,442 describes such a device. The frame provides a storage tub. The drawer is mounted pivotably relative to the top. This device has the flaw that it is not possible to store the portable electronic apparatus with the drawer. The user is required to remove the electronic apparatus before lying the drawer down in the tub. Furthermore, the tub and its cover occupy a significant surface area on the dashboard of the vehicle. Additionally, the fastening of the apparatus on the drawer and its removal are relatively complex.

SUMMARY

In this context, the invention aims to propose a holder device that is more user-friendly. To that end, the invention relates to a holder device of the aforementioned type, characterized in that the connection determines a sliding movement between the storage and usage positions, and in that, in the usage position, a usage volume is at least partially delimited by the frame and the drawer, said apparatus being maintained in the usage volume by a first and a second stop member coming into contact with the apparatus in at least two opposite points thereof and biased toward one another by at least one elastic member. It is thus more convenient to fasten and remove the apparatus from the drawer.

The device is provided to receive a portable electronic apparatus such as a telephone, GPS, or any other equivalent electronic apparatus.

The holder device is typically arranged in the dashboard of the vehicle. Alternatively, it is arranged in the center console of the vehicle, or in the trim of an opening or any other area situated in the passenger compartment of the vehicle.

The stationary frame is typically a container made from a plastic material, which bears part of the connecting elements for connecting the drawer to the frame. This container is for example completely closed, with the exception of an opening provided for the passage of the drawer. Alternatively, opposite the opening, the container has a bottom opening. According to another alternative, one or more side walls of the container, connecting the bottom to the opening, may be open.

In one embodiment, the connection of the drawer to the frame is arranged such that the drawer is movable with the electronic apparatus relative to the frame between the storage position and the usage position of the electronic apparatus.

Thus, the device according to the invention makes it possible to retract the electronic apparatus with the drawer into the volume. This is convenient, since it is not necessary to disassemble the electronic apparatus before retracting the drawer. The user causes the drawer to come out when he wishes to use the electronic apparatus, and pushes the drawer back into its storage position when he no longer wishes to use the electronic apparatus.

When the volume in which the electronic apparatus is stored is placed, for example, inside the dashboard, the electronic apparatus is not visible to people passing alongside the vehicle. This decreases the risks of theft.

In one embodiment, the frame at least partially delimits a storage volume in which the electronic apparatus is completely housed in the storage position.

In one example embodiment, the electronic apparatus protrudes at least partially outside the storage volume in the usage position, the usage position being deduced from the storage position by translation and/or rotation by an angle smaller than 45°. The fact that the usage position is deduced from the storage position by translation and/or rotation by an angle smaller than 45° means that the drawer, and the electronic apparatus, globally retain their orientation when the drawer goes from its usage position to its storage position. It is thus possible to impart a movement to the drawer that is substantially vertical or slightly inclined relative to the vertical to go from the usage position to the storage position. The volume needed for the travel of the drawer is thus reduced, such that it is possible to arrange the support device conveniently within the structure of the vehicle in which it is housed. The device has a significant vertical bulk in this case, but its bulk at the outer surface of the vehicle is reduced.

In one example embodiment, the usage position is deduced from the storage position by translation only. The translation is then typically in a vertical direction, i.e., substantially perpendicular to the rolling plane of the vehicle. In another example embodiment, the usage position is deduced from the storage position by rotation only, over a limited angular travel, smaller than 45°, preferably smaller than 30°, and still more preferably smaller than 15°. According to still another example embodiment, the usage position is deduced from the storage position by a combination of translation(s) and rotation(s).

The device may also have one or more of the features below, considered individually or according to any technically possible combinations.

Advantageously, the volume has an upward opening, the device being arranged so that the electronic apparatus passes through the opening when the drawer moves between the storage position and the usage position. The opening is typically found at the outer surface of the structure of the vehicle that receives the holder and storage device. For example, it is found at the outer surface of the dashboard.

Advantageously, the drawer includes a flap closing the opening in the storage position. Thus, the electronic apparatus is completely hidden when the drawer is in the storage position. Furthermore, if the flap has the same decoration as the surface of the structure of the vehicle receiving the holder and storage device, then that device is particularly discreet when the drawer is in the storage position. Furthermore, the flap protects the electronic apparatus from dust and the sun's rays in the storage position of the drawer. With the drawer is in the usage position, the flap serves as a sun visor.

Preferably, the electronic apparatus has a screen, the device being arranged so that in the usage position, the screen is in an orientation forming an angle smaller than 45° with respect to a vertical direction perpendicular to the rolling plane of the vehicle. In this orientation, it is easier for the driver to view the screen. Typically, the screen is in a practically vertical and transverse orientation.

Typically, the connection of the drawer to the frame is a sliding connection. This makes it possible to move the drawer easily relative to the frame. The guideway may be rectilinear or bowed. Alternatively, the connection of the drawer to the frame is a pivot connection or any other type of connection making it possible to obtain the desired movement for the drawer.

Typically, the device comprises an elastic member biasing the drawer toward the usage position, and a removable locking device for locking the drawer in the storage position. Thus, when the user unlocks the drawer relative to the frame, the elastic member automatically propels the drawer from its storage position to its usage position. The elastic member is typically a compression spring, inserted between the drawer and the frame. The locking device is of any suitable type. It is provided to be unlocked manually by the user, and to relock the drawer to the frame automatically, when the drawer is returned from its usage position to its storage position by the user. The locking device for example includes a movable member for locking the drawer on the frame, and a member for controlling the movement of the locking member. The locking member is for example a hook. The control member is for example a rotary button, or any other type of button, or a pivoting paddle.

Alternatively, the holder device does not include an elastic member biasing the drawer toward its usage position. On the contrary, it includes an elastic member biasing the drawer toward its storage position. In that case, the device includes a member for reversibly blocking the drawer in its usage position.

Typically, the drawer comprises a base surface on which a lower edge of the electronic apparatus rests when the electronic apparatus is fastened to the drawer, the base surface being covered with a flexible covering, for example a carpet. The flexible covering has the advantage that the lower edge of the electronic apparatus is not destroyed by contact or friction on the drawer. The covering may not be a carpet, but a rubber mat, or an elastomer met, or any other type of flexible material.

Preferably, the drawer comprises a bearing surface against which a rear face of the electronic apparatus bears when the electronic apparatus is fastened to the drawer by the first and second stop members. These first and second stop members may be of any type and have any type of shape. For example, the first and second stop members are movable relative to the bearing surface in a transverse direction, and designed to adapt around two opposite side edges of the electronic apparatus. Alternatively, they are movable relative to the bearing surface in a substantially vertical direction and they adapt around the upper and lower edges of the electronic apparatus. The upper and lower edges are respectively turned upward and downward in the usage position. The side edges are respectively turned toward the right and the left in the usage position. The longitudinal, transverse, front, rear, left and right directions are understood here in relation to the normal direction of movement of the vehicle. Thus, the holder device adapts to all sizes of electronic apparatuses, irrespective of the transverse width and/or the height of those apparatuses.

The bearing surface is to be turned toward the rear of the vehicle. The screen of the electronic apparatus is thus also turned toward the rear. Alternatively, the bearing surface is not turned toward the rear of the vehicle, but may be turned sideways toward a right side or a left side of the vehicle or turned in an inclined direction both relative to the longitudinal direction and the transverse direction. Typically, the bearing surface and the base surface are perpendicular to one another or form an angle close to 90° relative to one another.

The first and second stop members are for example two hooks. These hooks are typically L-shaped, with a free end part situated against or at a front surface of the electronic apparatus. Thus, the electronic apparatus is caught between the rear bearing surface and the end segments of the hooks. They prevent the electronic apparatus from tilting, in particular toward the rear of the vehicle. Alternatively, the storage device includes several hooks along each of the two opposite side edges of the electronic apparatus and/or along the upper and lower edges of the electronic apparatus. All of the hooks are movable.

For example, the holder device comprises an elastic return member for returning the two stop members toward one another in the transverse or vertical direction. This elastic member is for example a traction spring connecting the two stop members to one another. Alternatively, the fastening device includes two elastic return members each biasing one of the stop members toward the other hook.

The elastic members are for example situated on one side of the drawer opposite the bearing surface. In this case, the stop members include a frontal part situated on the side of the drawer where the bearing surface is located, and a rear part, which is located on the side of the drawer where the elastic members are located. The drawer then includes one or two slots passing through the drawer over its entire thickness, and allowing guiding of the stop members. Each stop member is engaged in a slot.

According to a second aspect, the invention relates to a vehicle dashboard, comprising a holder device for a portable electronic apparatus having the above characteristics, the dashboard having an outer surface, the volume being situated completely below the outer face. In other words, the volume in which the electronic apparatus is housed in the storage position of the drawer is situated completely inside the dashboard.

The vehicle is typically a motor vehicle, for example a car or truck.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION OF THE ILLUSTRATED EMBODIMENT(S)

Figure 1:
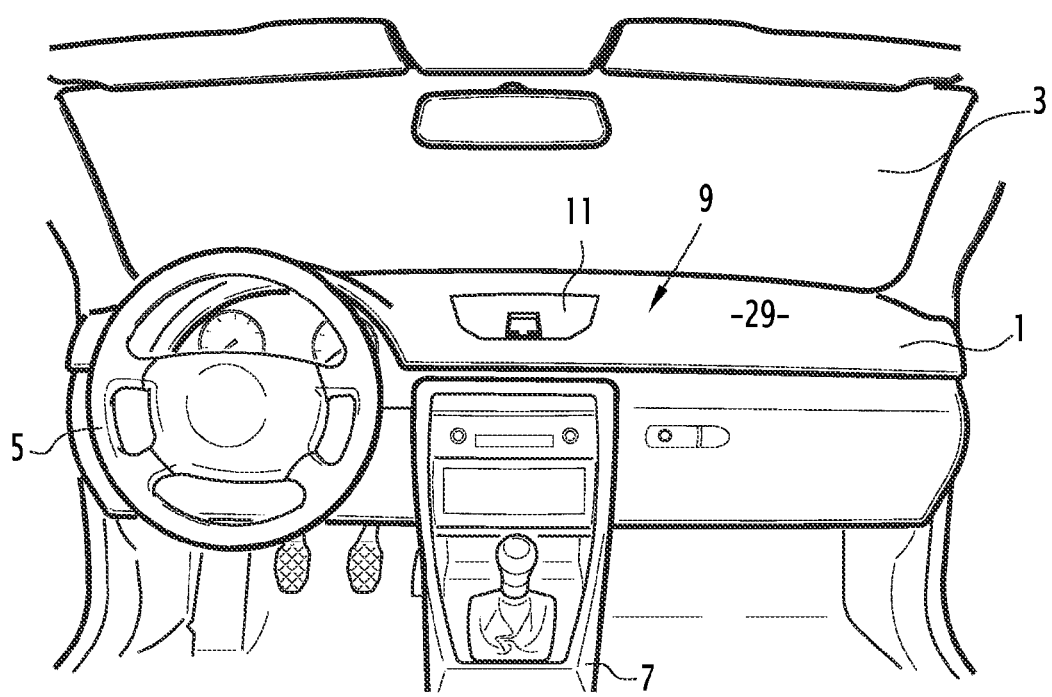
FIG. 1 is a simplified diagrammatic illustration of the front part of the passenger compartment of a motor vehicle, the dashboard of that vehicle including a holder device according to the invention.

The motor vehicle shown in FIG. 1 has a dashboard 1 extending transversely below the windshield 3, a steering wheel 5 and a center console 7. The dashboard 1 is equipped with a holder device 9 for an electronic apparatus, only one flap 11 of that device being visible.

Figure 3:
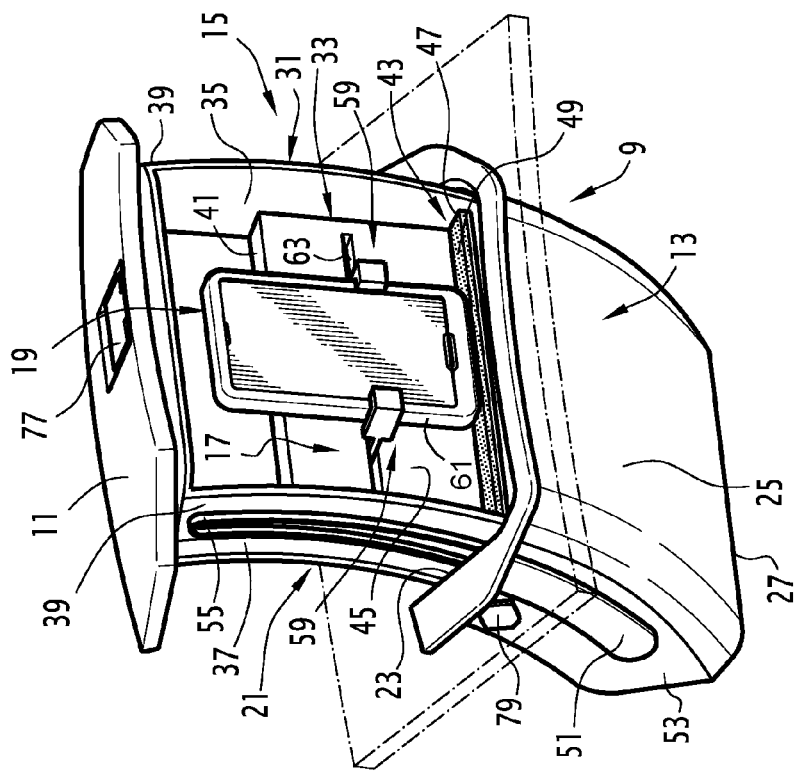
FIG. 3 is a view similar to FIG. 2, the drawer being in the usage position.
Figure 2:
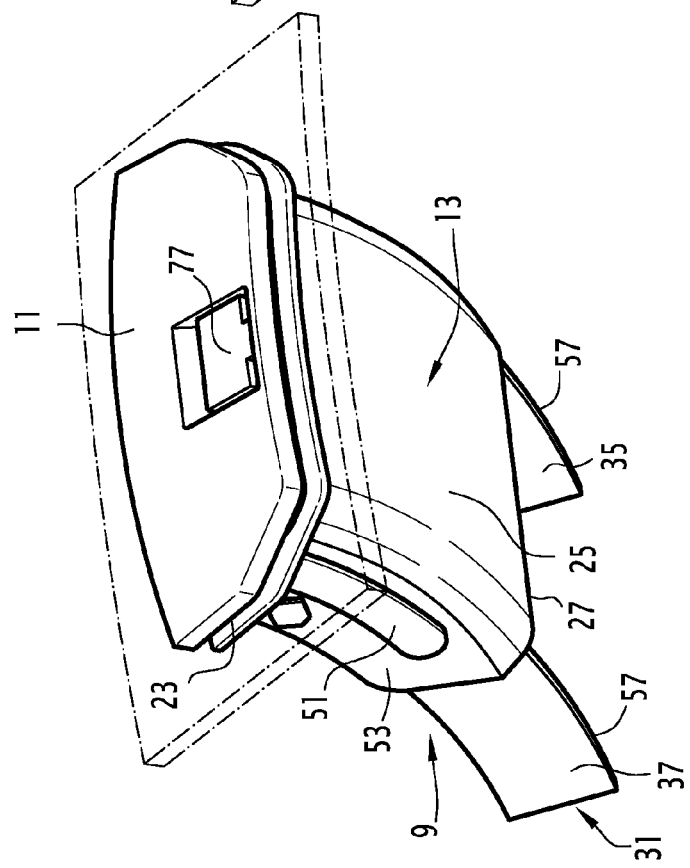
FIG. 2 is a perspective view of the holder and storage device of the invention, the drawer being in the storage position.

As shown in FIGS. 2 and 3, this device includes:
- a stationary frame 13, secured to a structural element of the vehicle that is not shown;
- a drawer 15, including a device 17 for removably fastening an electronic apparatus 19 to the drawer 15;
- a connection 21 of the drawer 15 to the frame 13, arranged such that the drawer is movable with the electronic apparatus 19 between a storage position (FIG. 2) and a usage position of the electronic apparatus (FIG. 3).

The frame 13 is a plastic container. It inwardly delimits a storage volume in which the electronic apparatus 19 is completely housed in the storage position of the drawer. It has an opening 23 (FIG. 3) turned upward, a side wall with a closed contour 25, one end of which delimits the opening 23, and a bottom 27 opposite the opening 23. The opening 23 is situated at an outer surface 29 of the dashboard. In the illustrated example, the side wall 25 has a substantially rectangular section, as does the opening 23.

Aside from the flap 11, the drawer 15 includes two side flanges 31 and a holder 33 for the electronic apparatus 19. The flanges 31 are elongated parts, extending parallel to one another and across from one another. They fit substantially into two vertical and longitudinal planes, parallel to each other. They each have a large inner face 35 turned toward the other flange, and a large outer face 37 turned toward the outside of the vehicle. The flanges 31 each have a curved shape, with a center of curvature that is situated in the plane in which the flange is fitted. The center of curvature is offset toward the front of the vehicle The flap 11 is rigidly fastened to the upper end 39 of the two flanges 31. It extends in a plane substantially perpendicular to the two planes in which the two flanges fit.

The support 33 is an L-shaped piece. It is situated between the two flanges 31. It is rigidly fastened to each of the two flanges 31, and more specifically, to the inner faces 35 of those flanges. It includes a bearing wall 41 and a support wall 43, substantially perpendicular to one another. Each of the two walls is rigidly fastened to the two flanges 31 by two opposite side edges. In the usage position of the drawer 15, illustrated in FIG. 3, the wall 41 is substantially vertical and transverse, while the support wall 43 is substantially horizontal and transverse.

The wall 41 has a bearing surface 45 against which a rear face of the electronic apparatus bears when the latter is fastened to the drawer. The surface 45 is turned toward the rear of the vehicle. The support wall 43 has a base surface 47 turned upward, on which a lower edge of the electronic apparatus 19 rests when the latter is fastened to the drawer. The base surface 47 is covered with carpet 49.

The connection 21 of the drawer 15 to the frame 13 is a sliding connection. It includes two bowed guideways 51, formed in two opposite faces 53 of the side wall 25 of the frame 13. The connection 21 also includes two ribs 55 forming slides, engaged in the guideways 51. These ribs have a bowed shape and are formed on the large outer faces 37 of the flanges. As shown in FIG. 2, the flanges 31 extended considerably below the holder 33. Orifices (not shown) are arranged in the bottom 27 of the frame 13 to allow the passage of the lower ends 57 of the flanges when the drawer 13 returns to its storage position. Thus, these lower ends 57 protrude below the bottom 27 in the storage position of the drawer.

The device 17 for removably fastening the electronic apparatus 19 to the drawer 13 is supported by the bearing wall 41 of the holder. This device includes two stop members 59, movable in a transverse direction relative to the bearing surface 45 and designed to adapt around two opposite side edges 61 of the electronic apparatus 19. To that end, the through transverse slot 63 is arranged in the bearing wall 41. The stop members 59 are engaged and move along the slot 63. Each stop member 59 for example is in the shape of a hook, and includes an L-shaped end part situated on the rear side of the bearing wall 41, protruding relative to the bearing surface 45. This part includes a segment 64 with an orientation substantially perpendicular to the surface 45, and an end segment 65 with an orientation substantially parallel to the surface 45. The segments 64 abut against the edges 61 of the electronic apparatus. The end segments 65 are placed across from the front face of the electronic apparatus, and prevent the electronic apparatus from tilting.

Figure 4:
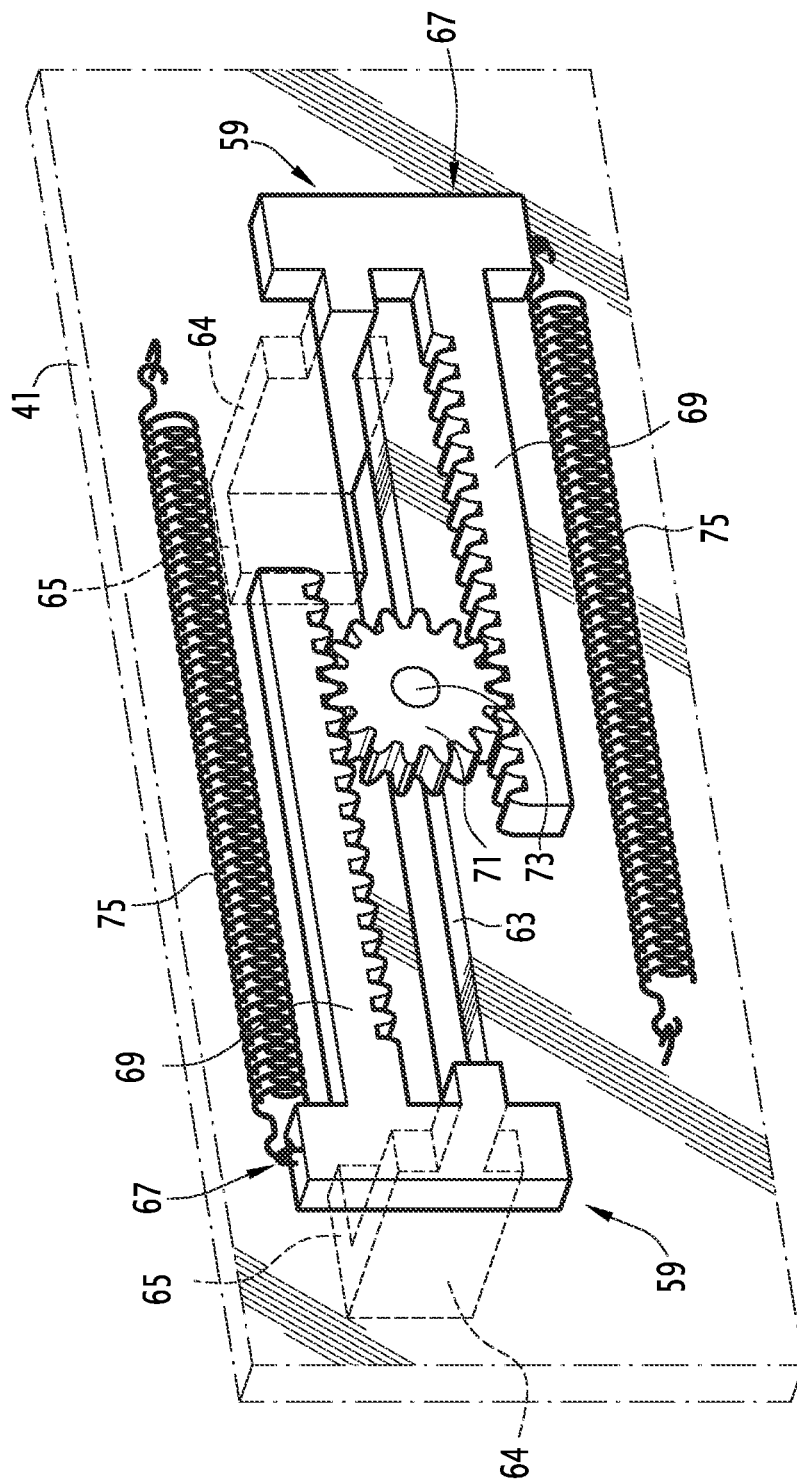
FIG. 4 is a front view of part of the drawer, on the side opposite the electronic apparatus.

Each stop member 59 also includes a guide part 67, which protrudes toward the front of the vehicle relative to the bearing wall 41. As shown in FIG. 4, this part includes a transverse rack 69. A toothed wheel 71 meshes the two racks 69. It rotates freely around the shaft 73 secured to the wall 41. The movements of the two hooks 59 are thus synchronized with each other. The movement of one of the two hooks 59 transversely causes the movement of the other 59, via the rack 69 and the toothed wheel 71, over an identical travel.

The fastening device 17 also includes two traction springs 75, connecting the parts 67 of the hooks and the wall 41. Each of the fraction springs 75 biases one of the hooks transversely toward the other hook.

If necessary, the fastening device 17 includes a retarder (not shown) designed to slow the movement of the two hooks under the effect of the biasing of the traction springs 75. Thus, as shown by FIG. 3, in the usage position, a usage volume is partially delimited by the frame 13 and the drawer 15, the apparatus 19 being kept in the usage volume by the stop members 59 coming into contact with the apparatus 19 at two opposite points thereof and biased toward one another by the elastic members 75.

The holder and storage device 9 also includes an elastic member biasing the drawer 15 toward its usage position. This elastic member (not shown) is for example a compression spring inserted between the frame 13 and the drawer 15.

The device also includes a retarder 79, slowing the movement of the drawer from its storage position to its usage position under the effect of the thrust from the elastic member.

Furthermore, the holder and storage device 9 also includes a removable locking device for locking the drawer 15 relative to the frame 13 in the storage position. The locking device for example comprises a pivoting hook (not shown) supported by the flap 11, cooperating with a ring (not shown) supported by the frame 13. The hook is moved using a paddle 77 situated on an upper face of the cover and able to be actuated by a user.

The operation of the holder and storage device will now be described. In the initial state, it is considered that the electronic apparatus is not positioned on the drawer, and the drawer is in its storage position.

To place the portable electronic apparatus 19 on the drawer, the user actuates the paddle 77 to unlock the drawer 15 relative to the frame 13. The compression spring then propels the drawer 15 upward to its usage position. The ribs 55 slide along the guideways 51 and guide the drawer in a substantially circular movement around a transverse axis. This axis is offset toward the front of the vehicle as illustrated in FIG. 3. The amplitude of the rotation is approximately 15°. In this situation, the base surface 47 is substantially at the opening 23. The bearing surface 45 is located outside the frame 13 and is upright above the opening 23.

The user then separates the two hooks 59 from each other transversely, manually. He places the electronic apparatus 19 on the base surface 47. He presses a rear face of the electronic apparatus 19 against the bearing surface 45. He then releases the hooks 59. Under the effect of the traction of the springs 75, the two hooks 59 come closer together until the segments 64 are abutting against the edges 61 of the electronic apparatus. The movements of the hooks 59 are synchronized by the racks 69 and the toothed wheel 71, such that the electronic apparatus 19 is still centered transversely at the middle of the drawer 15.

The user can next use the electronic apparatus 19. If he no longer wishes to use the electronic apparatus 19, but does not wish to separate it from the drawer 15, he can store it inside the dashboard. To that end, the user presses the flap 11 downward. He thus causes the drawer 15 to go from its usage position to its storage position, with the electronic apparatus 19 still fastened to the drawer 15. The drawer 15 performs the reverse travel from before. It is again guided by the ribs 55 sliding in the guideways 51.

In the storage position, the cover 11 completely closes off the opening 23 and bears against a peripheral edge of the opening. The electronic apparatus 19 is completely housed in the volume delimited by the stationary frame 13 and the cover 11. When the drawer 15 reaches its storage position, the locking device locks automatically. The user can then release the flap 11.

If the user once again wishes to use the electronic apparatus, he lifts the paddle 77, causing the drawer 15 and the electronic apparatus 19 to come out.

The invention claimed is:

1. A holder device for a portable electronic apparatus for a motor vehicle, the device comprising:
   a stationary frame, secured to a structural element of the vehicle;
   a drawer;
   a connection of the drawer to the frame arranged such that the drawer is movable relative to the frame between a storage position and a usage position, wherein the electronic apparatus can be used by an occupant of the vehicle in the usage position;
   wherein the connection provides a sliding movement between the storage and usage positions,
   wherein at least a portion of the drawer protrudes outside a storage volume of the frame in the usage position,
   wherein, in the usage position, a usage volume is at least partially delimited by the frame and the drawer, said apparatus being maintained in the usage volume by a first and a second stop member configured to maintain said apparatus by coming into contact with the apparatus in at least two opposite points thereof,
   wherein the first and second stop members are biased toward one another by at least one elastic member, and
   wherein the portable electronic apparatus is maintained to the drawer in a position at which a large face of the portable electronic device is substantially completely accessible by the occupant of the vehicle in the usage position of the drawer.

2. The device according to claim 1, wherein the drawer is movable with the electronic apparatus relative to the frame between the storage position and the usage position.

3. The device according to claim 1, the electronic apparatus protruding at least partially outside the storage volume in the usage position.

4. The device according to claim 1, wherein the usage position is deduced from the storage position by translation, rotation by an angle smaller than 45°, or both translation and rotation.

5. The device according to claim 2, wherein the storage volume has an upward opening, the device being arranged so that the electronic apparatus passes through the opening when the drawer moves between the storage position and the usage position.

6. The device according to claim 5, wherein the drawer includes a flap closing the opening in the storage position.

7. The device according to claim 1, wherein the device comprises an elastic member biasing the drawer toward the usage position, and a locking device for locking the drawer in the storage position.

8. The device according to claim 1, wherein the drawer comprises a base surface on which a lower edge of the electronic apparatus rests when the electronic apparatus is fastened to the drawer, the base surface being covered with a carpet or other flexible covering.

9. The device according to claim 1, wherein the drawer comprises a bearing surface against which a rear face of the electronic apparatus bears when the electronic apparatus is fastened to the drawer, the stop members being two hooks movable in a transverse direction relative to the bearing surface and designed to adapt around two opposite side edges of the electronic apparatus.

10. A vehicle dashboard, comprising a holder device for a portable electronic apparatus according to claim 1, the dashboard having an outer surface, the storage volume being situated completely below the outer surface.

11. The device according to claim 1, wherein the holder device comprises a locking device for locking the drawer relative to the frame, the locking device having an actuator configured to be actuated by an occupant of the vehicle to a position where the drawer is free to move relative to the frame between the storage position and the usage position.

12. A vehicle dashboard, comprising a structural element, an outer surface and a holder device for a portable electronic apparatus, the holder device comprising:
   a stationary frame secured to the structural element;
   a drawer having a fastener for removably fastening the portable electronic apparatus to the drawer;
   a connection of the drawer to the frame arranged such that the drawer is movable relative to the frame between a storage position and a usage position, wherein the electronic apparatus can be used by an occupant of the vehicle in the usage position;
   wherein the frame at least partially delimits a storage volume in which the electronic apparatus can be completely housed in the storage position of the drawer;
   wherein at least a portion of the drawer protrudes outside the storage volume in the usage position,
   wherein, in the usage position, a usage volume is at least partially delimited by the frame and the drawer, the fastener comprising a first and a second stop member maintaining said apparatus in the usage volume by coming into contact with the apparatus in at least two opposite points thereof,
   wherein the fastener further comprises at least one elastic member biasing the first and second stop members toward one another, and
   wherein the fastener removably fastens the portable electronic apparatus to the drawer in a position at which a large face of the portable electronic device is substantially accessible by the occupant of the vehicle in the usage position of the drawer.

13. The vehicle dashboard according to claim 12, wherein the holder device comprises a locking device for locking the drawer relative to the frame, the locking device having an actuator configured to be actuated by an occupant of the vehicle to a position where the drawer is free to move relative to the frame between the storage position and the usage position.

14. The vehicle dashboard according to claim 13, wherein the actuator is outside the outer surface.

15. The device according to claim 1, wherein the drawer comprises a fastener for removably fastening the portable electronic apparatus to the drawer.

16. The device according to claim 1, wherein the frame at least partially delimits the storage volume in which the electronic apparatus can be completely housed in the storage position of the drawer.

17. A holder device for a portable electronic apparatus for a motor vehicle, the device comprising:
- a stationary frame secured to a structural element of the vehicle;
- a drawer having a fastener for removably fastening the portable electronic apparatus to the drawer;
- a connection of the drawer to the frame arranged such that the drawer is movable relative to the frame between a storage position and a usage position, wherein the electronic apparatus can be used by an occupant of the vehicle in the usage position;
- wherein the connection provides a sliding movement between the storage and usage positions,
- wherein the frame at least partially delimits a storage volume in which the electronic apparatus can be completely housed in the storage position of the drawer,
- wherein at least a portion of the drawer protrudes outside the storage volume in the usage position,
- wherein, in the usage position, a usage volume is at least partially delimited by the frame and the drawer, the fastener comprising a first and a second stop member maintaining said apparatus by coming into contact with the apparatus in at least two opposite points thereof,
- wherein the fastener further comprises at least one elastic member biasing the first and second stop members toward one another, and
- wherein the fastener removably fastens the portable electronic apparatus to the drawer in a position at which a large face of the portable electronic device is substantially completely accessible by the occupant of the vehicle in the usage position of the drawer.

* * * * *